United States Patent [19]

Toguchi

[11] Patent Number: 4,841,381
[45] Date of Patent: Jun. 20, 1989

[54] STILL REPRODUCTION CONTROLLING CIRCUIT

[75] Inventor: Akira Toguchi, Daito, Japan

[73] Assignee: Sanyo Electric Co., Ltd., Moriguchi, Japan

[21] Appl. No.: 54,911

[22] PCT Filed: Sep. 16, 1986

[86] PCT No.: PCT/JP86/00480
§ 371 Date: May 8, 1987
§ 102(e) Date: May 8, 1987

[87] PCT Pub. No.: WO87/01894
PCT Pub. Date: Mar. 26, 1987

[30] Foreign Application Priority Data

Sep. 18, 1985 [JP] Japan ............... 60-142168[U]

[51] Int. Cl.$^4$ ........................................ H04N 5/782
[52] U.S. Cl. ............................................ 360/10.3
[58] Field of Search ............... 360/10.1, 10.2, 10.3, 360/35.1, 38.1; 358/312

[56] References Cited

U.S. PATENT DOCUMENTS

| 4,280,146 | 7/1981 | Misaki et al. | 360/10.2 |
| 4,306,255 | 12/1981 | Misaki et al. | 360/10.3 |
| 4,338,631 | 7/1982 | Ota | 360/10.3 |
| 4,342,053 | 7/1982 | Hirota | 360/10.3 |
| 4,495,525 | 1/1985 | Uchida et al. | 360/10.3 |
| 4,531,162 | 7/1985 | Tokumitsu | 360/10.3 |
| 4,611,252 | 9/1986 | Igata et al. | 360/10.3 |
| 4,649,439 | 3/1987 | Tanaka | 360/10.3 |

Primary Examiner—Donald McElheny, Jr.
Attorney, Agent, or Firm—Armstrong, Nikaido, Marmelstein, Kubovcik & Murray

[57] ABSTRACT

A still reproduction controlling circuit for controlling a motor driving a tape at a low speed includes a noise detector for detecting a state in which a reproduction output is falling in an FM brilliance signal, a reference pulse generator for generating a reference pulse of a predetermined width corresponding to the vertical blanking period, in response to a head change over signal, a discriminator receiving outputs from the noise detector and the reference pulse generator for outputting a stop motor control signal to stop the driving of the motor when the output of the noise detector signal coincides with the reference pulse, to drive the noise band into a vertical blanking period, and an error operation preventer connected to the noise detector and receiving the head change over signal, for outputting an error prevention signal to the discriminator in response to detection of noise coinciding in time with the reference pulse, such that the stop motor control signal from the discriminator is inhibited.

1 Claim, 3 Drawing Sheets

STILL REPRODUCTION CONTROLLING CIRCUIT

FIELD OF THE INVENTION

The present invention relates to a still reproduction controlling circuit in a helical scan video tape recorder (VTR).

BACKGROUND ART

As the picture signals of one field are formed in one record track in a helical scan VTR for forming the record track inclined with respect to the tape longitudinal direction, thereby to obtain the reproduction output with the tape running being stopped. Also, in the still reproduction, the noise band to be caused due to the different scanning track during the recording may be driven into the vertical blanking period by means of changing the tape stop position.

Namely, it is possible to prevent the noises from being caused on the still reproduction images.

One of the noise driving methods is to stop the running operation of the tape when the noises of the reproduction output have conformed to the timing of the pulse showing the vertical blanking period through the driving operation of the tape at the low speed (for example, see Japanese Laid-Open Patent Publication Tokkai-sho No. 60-12881). This method adopts the construction of detecting the envelope fall of the reproduction signal to detect the noise position.

In the helical scan VTR, normally the recording and reproducing is performed by the use of two heads which are opposite by 180°. And the reproducing output from two heads is rendered continuous by the switching operation, but the head switching time-point is a portion where the head starts its contact with the tape or finishes its contact, so that the reproducing output may become unstable. When the reproducing output has been lowered in the head switching portion of the output being unstable, the error detection as the noise band is performed so that the noise driving operation may not be performed correctly. Namely, in the arrangement where the tape feeding is stopped through the coincidence with the vertical blanking period when the envelope fall portion is discriminated as the noise band, the output fall portions except for the noise bands may be detected as noise bands so that the correct noise driving operation may not be performed.

SUMMARY OF THE INVENTION

Accordingly, in the present invention, an error operation preventing means is provided, which is adapted to detect the existence of the other noises to release the tape stop, when the noises have conformed to the vertical blanking period, to cause the tape to run.

As the noise band is provided in the other portion of the reproduction output when the output fall portions except for the noise bands have been mistaken as noise bands to come to a stop if a still reproduction control circuit composed of such construction as described hereinabove is employed, the noise bands are detected to release the tape stop, the tape is again driven so that the noises may be correctly driven.

BRIEF DESCRIPTION OF THE DRAWINGS

The embodiment of the present invention will be described in accordance with the drawings.

DETAILED DESCRIPTION OF THE PREFERRED EMBODIMENT

Figure 1:
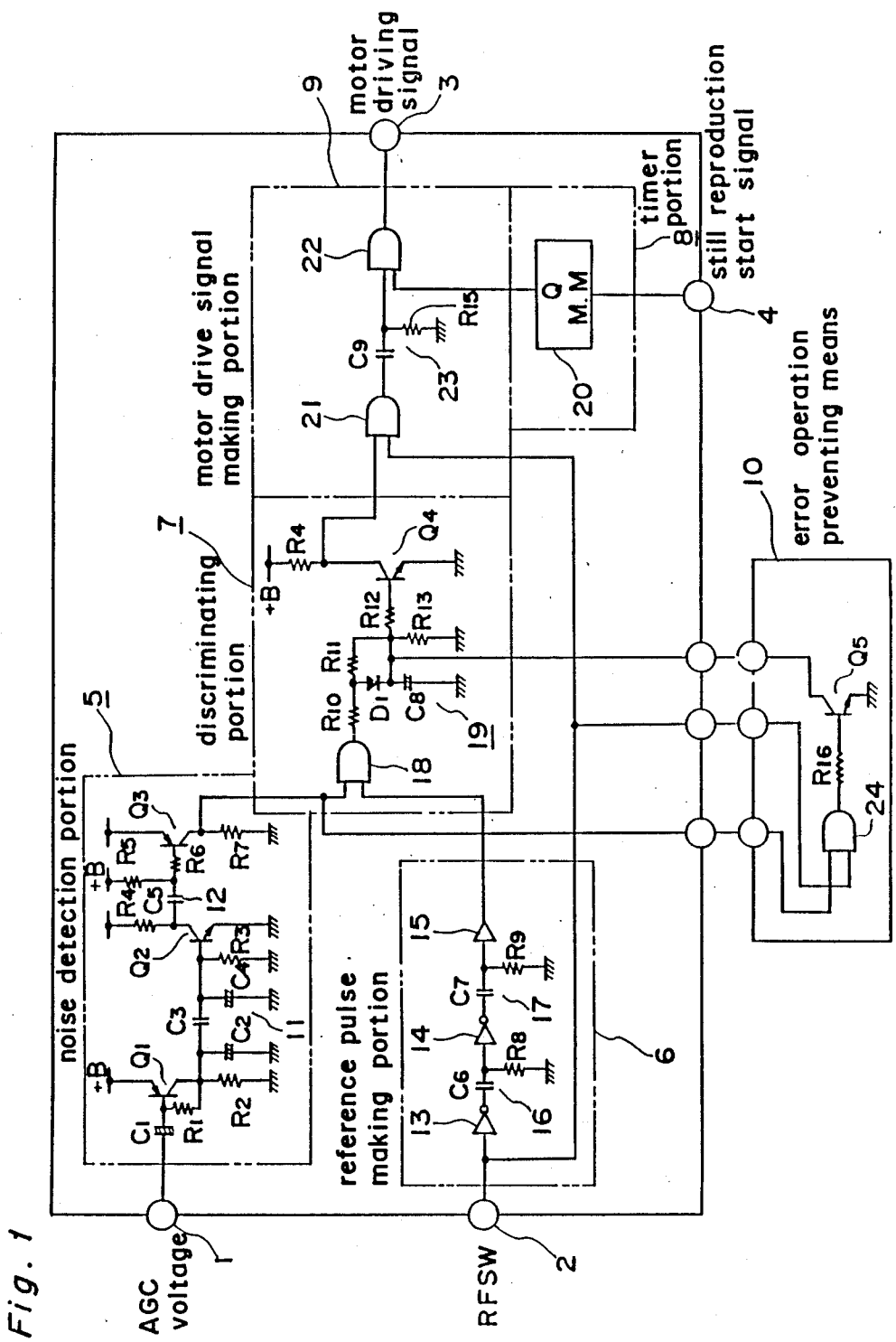
FIG. 1 is a circuit diagram showing the embodiment of a still reproduction controlling circuit of the present invention.

Referring to FIG. 1, (1) is an input terminal upon which the AGC control voltage of the FM brilliance signal system is applied, (2) is an input terminal of a head change-over (RFSW) signal, (3) is an output terminal of a motor driving signal to be applied onto the drive controlling circuit of the capstan motor, (4) is an input terminal of a still reproduction start signal.

(5) is a noise detection portion which receives an input of the AGC control voltage to detect the reproduction output fall portion to output the detection pulse of a given pulse width. (6) is a reference pulse making portion which outputs the pulse of given width corresponding to the vertical blanking period from the falling timing of the head change-over signal (a).

(7) is a discriminating portion which detects the coincidence of timing between the output of the noise detection portion (5) output and the reference pulse making portion (6) output to output the coincidence detection signal. (8) is a timer portion which determines the largest period from the rise of the still reproduction start signal to the tape stop. (9) is a motor drive signal making portion which produces the motor drive signal in accordance with the rise of the head change-over (a) with the formation and output of the motor drive signal being controlled by the output of the discriminating portion (7) and the timer portion (8).

(10) is an error operation preventing means with the noise detecting portion (5) output (d) and the head change-over signal (a) as inputs, so that the error operation preventing signal is outputted.

The noise detecting portion (5) is provided with a transistor (Q1) for buffer use, a time constant circuit (11) for smoothing operation, a transistor (Q2) for shaping the wave form, a time constant circuit (12) for deciding the pulse width, a transistor (Q3) for shaping the wave form. The AGC control voltage is applied upon the terminal (1) as described hereinabove, the noise detection pulse (d) of a given-value width is outputted when the signal has become larger than the given value.

The reference pulse producing portion (6) is composed of inverters (13), (14), a buffer (15), time constant circuits (16), (17) and delays (time constant circuit (16)) the timing of the falling of the head change-over signal (a) to output a reference pulse (e) of the pulse width determined by the time constant circuit (17).

The discrimination portion (7) is provided with a time constant circuit (19) composed of a first AND gate (18), resistors (R11), (R13), a capacitor (C8), and a diode (D1), and of an output transistor (Q4).

The H level is outputted as the output of the discrimination portion (7) at the state of the output transistor (Q4) being normally off. The noise detection pulse (d) and the reference pulse (e) are applied upon the first AND gate (18).

And when both the pulses are outputted in coincidence, the output of the first AND gate (18) becomes H in level to charge the capacitor (C8). The base of the output transistor (Q4) becomes H in level to turn on the output transistor (Q4). Namely, when the discrimination portion (7) detects the coincidence, the output becomes L in level.

The timer portion (8) is composed of a monostable-multivibrator (20) with a metastable period being set to about four seconds. Namely, the output of the timer portion (8) becomes H in level for about four seconds from the rising of the still reproduction start signal.

The motor drive pulse producing portion (9) has second, third AND gates (21), (22) and the time constant circuit (23). The discrimination portion (7) output and the head change-over signal (a) are connected to the second AND gate (21). The output of the time constant circuit (23) and the output of the timer portion (8) are applied upon the third AND gate (22) with the output of the third AND gate (22) becoming the motor drive signal.

The error operation preventing means (10) is provided with a fourth AND gate (24) which inputs the noise detecting portion (5) output (d) and the head change-over signal (a), and an output transistor (Q5). The collector of the output transistor (Q5) is connected with the capacitor (C8) of the discrimination portion (7) so that the electric charge of the capacitor (C8) may be discharged. The output of the fourth AND gate (24) becomes H in level when the head change-over signal (a) is detected in noise during the H level to turn on the output transistor (Q5). When the fourth AND gate (24) output becomes H in level with the capacitor (C8) being charged, the electric charge of the capacitor (C8) is discharged so that the discrimination portion (7) output is varied into H in level.

Figure 3:
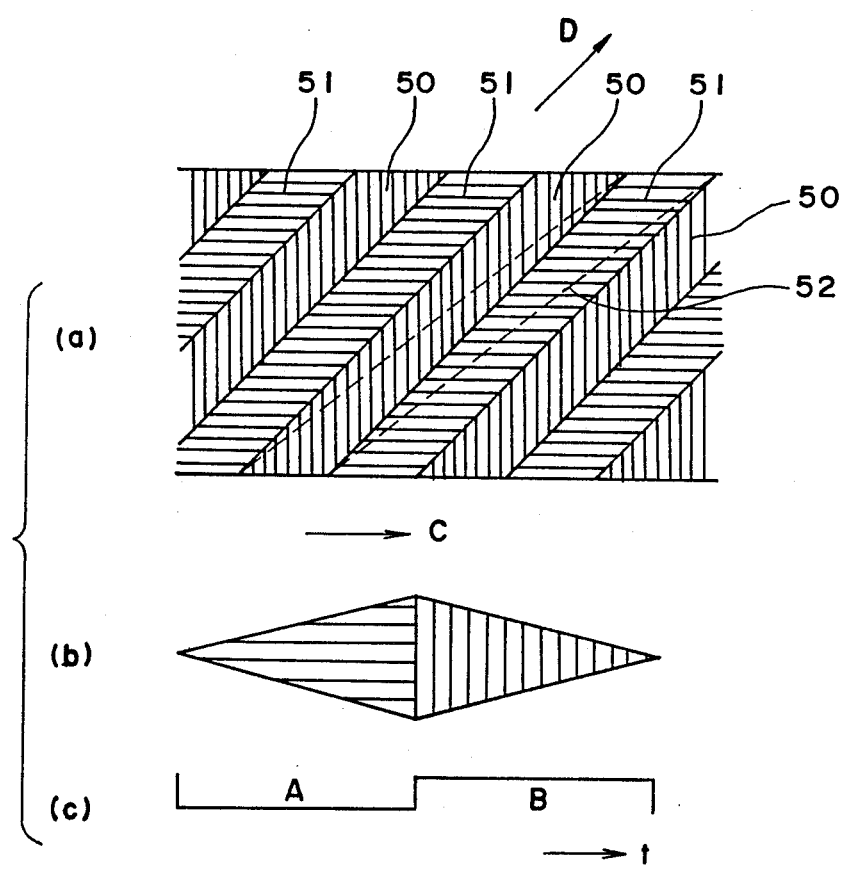
FIG. 3 is an illustrating view showing the condition of the still reproduction of the circuit of FIG. 1.

The still reproduction in the embodiment will be described hereinafter in accordance with FIG. 3. The tracks (50), (51) recorded by the head of the different azymuth as shown in (a) are provided side by side on the tape. The arrow (C) is a tape running direction, the (D) is a head rotating direction.

In the optimum still condition, the tracks of two rotary heads are shown in broken line (52). If the head switch-over signal is one shown in (c), the output (b) is provided with the A head output being gradually larger and the B head output being gradually smaller. Thus, the noise band is driven near the falling of the head change-over pulse.

The noise drawing-in operation will be described hereinafter in accordance with FIG. 2. When the still reproduction is instructed during the reproduction of the VTR and the still reproduction start signal rises to H in level, the tape running once stops and the timer portion (8) output becomes H in level to open the third AND gate (22). Thus, the motor drive signal (g) of the pulse width determined by the time constant circuit (23) is produced in synchronous relation to the rising of the head change-over signal (a). The capstan motor is driven by the motor driving signal (g) so that the tape is intermittently caused to run little by little.

Figure 2:
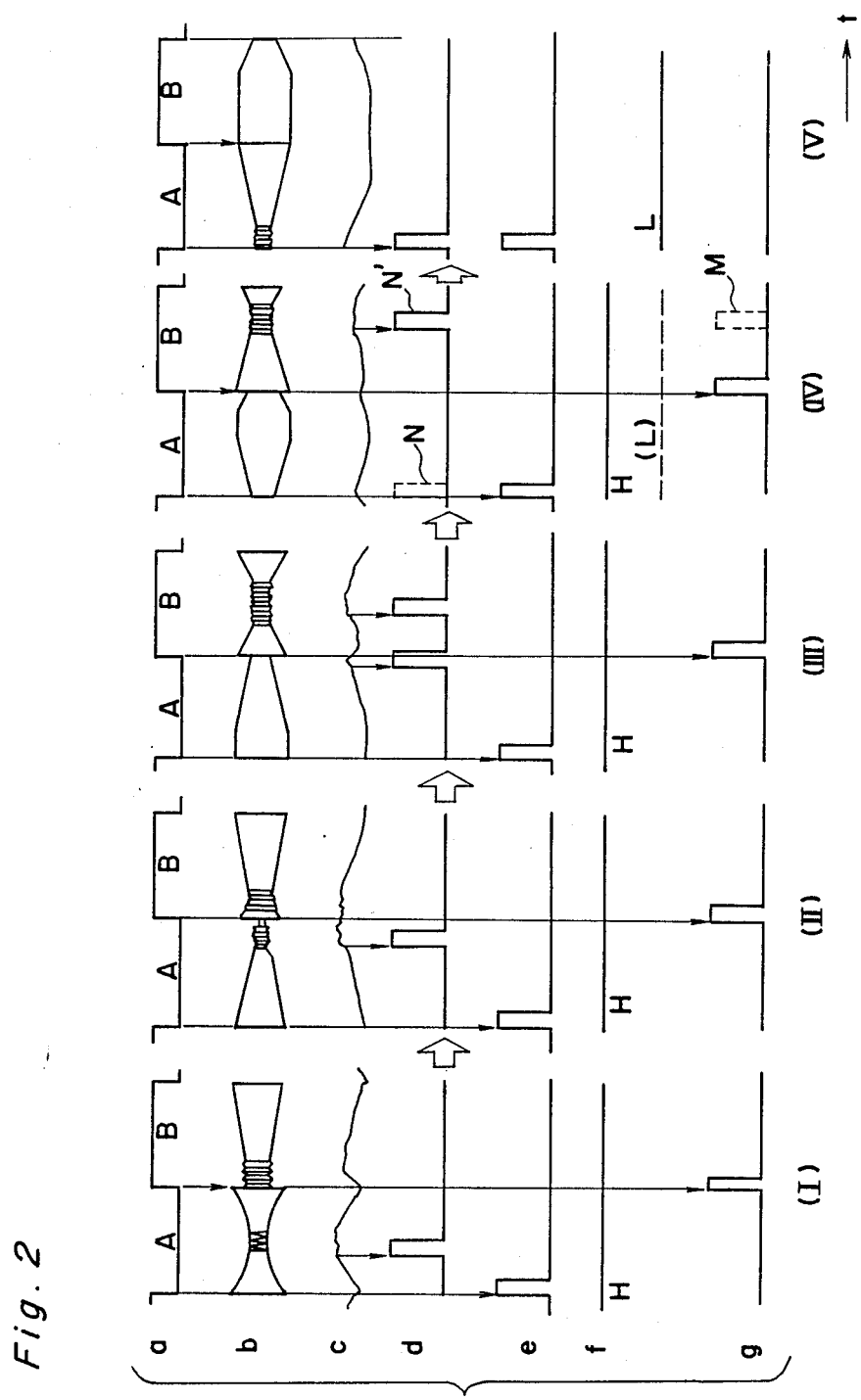
FIG. 2 is a wave form chart for illustrating the circuit operation of FIG. 1.

(I), (II), (III), (IV), (V) of FIG. 2 show the variation when the tape is caused to run at low speed like this. Namely, changes in the reproduction output (b) through the movement of the tape are known.

As it sequentially changes for the tape from the condition of (I) to the condition of (V), the reproduction output (b) changes so that the detection wave form (c) of the AGC control voltage is changed. The changes in the detection wave form is related to the movement of the noise band, the timing of the noise detection pulse (d) changes together with the tape movement in accordance with it. As the first AND gate (18) output does not become H in level so long as the timing of the noise detection pulse (d) does not coincide with the reference pulse (e), the output of the discrimination portion (7) remains H in level. Namely, the low speed driving operation of the tape is continued. When the noise detection pulse (d) conforms to the reference pulse (e) by the delivery of the tape, the first AND gate (18) output becomes H, the capacitor (C8) is charged to turn on the output transistor (Q4). Thus, the second AND gate (21) closes and the motor driving signal in accordance with the subsequent rising of the head change-over signal is outputted no more to stop the tape at the state of driving in the noise. Namely, the noise is driven in during the vertical blanking period so that the tape stops (see (V)).

However, the reproduction output becomes unstable near the head change-over time point except for the noise band, so that the noise detection pulse may be outputted (broken line (N) of (IV)). Even if the noise detection pulse (N) conforms in timing to the reference pulse (e), the tape running stops. However, in the embodiment, the noise detection pulse (N') corresponding to the true noise band exists, so that the output of the fourth AND gate (24) becomes in H level to turn on the output transistor (Q5).

And the electric charge of the capacitor (C8) is discharged to turn off the output transistor (Q4). Thus, the output of the discrimination portion (7) changes from the L level to the H level. In the motor drive signal producing portion (9), the motor driving signal (broken line (M) of IV) is produced in accordance with the rising changes to re-open the tape running operation. That is, the error operation of the still reproduction controlling circuit is prevented. Thereafter, the tape is intermittently delivered till the true noise band conforms to the vertical blanking period or till the output of the timer portion (8) changes to the L level so as to draw in the noise band. As described hereinabove, according to the present invention, the still reproduction controlling circuit, which drives the tape at a low speed to drive the noise band into the vertical blanking period, may be prevented from doing the error actions, thus being effective.

What is claimed is:

1. A still reproduction controlling circuit for controlling a motor driving a tape at a low speed, comprising:
    noise detection means for detecting a state in which a reproduction output is falling in an FM brilliance signal;
    reference pulse generating means for generating a reference pulse of a predetermined width corresponding to the vertical blanking period, in response to a head change over signal;
    discriminating means, receiving outputs from said noise detection means and said reference pulse generating means, for outputting a stop motor control signal to stop the driving of said motor when the output of said noise detection signal coincides with said reference pulse, to drive said noise band into a vertical blanking period; and
    an error operation preventing means, connected to said noise detection means and receiving said head change over signal, for outputting an error prevention signal to said discriminating means in response to the detection of noise coinciding in time with said reference pulse, such that said stop motor control signal from said discriminating means is inhibited.

* * * * *